United States Patent
Erivantcev et al.

(10) Patent No.: US 11,054,923 B2
(45) Date of Patent: Jul. 6, 2021

(54) AUTOMATIC SWITCHING BETWEEN DIFFERENT MODES OF TRACKING USER MOTIONS TO CONTROL COMPUTER APPLICATIONS

(71) Applicant: Finch Technologies Ltd., Tortola (VG)

(72) Inventors: Viktor Vladimirovich Erivantcev, Ufa (RU); Alexey Ivanovich Kartashov, Moscow (RU); Daniil Olegovich Goncharov, Ufa (RU); Guzel Kausarevna Khurmatullina, Ufa (RU)

(73) Assignee: Finch Technologies Ltd., Fish Bay (VG)

(*) Notice: Subject to any disclaimer, the term of this patent is extended or adjusted under 35 U.S.C. 154(b) by 0 days.

(21) Appl. No.: 16/599,903

(22) Filed: Oct. 11, 2019

(65) Prior Publication Data

US 2021/0109606 A1    Apr. 15, 2021

(51) Int. Cl.
*G06F 3/038* (2013.01)
*G06F 3/01* (2006.01)
*G06F 3/0346* (2013.01)

(52) U.S. Cl.
CPC ............ *G06F 3/038* (2013.01); *G06F 3/011* (2013.01); *G06F 3/0346* (2013.01)

(58) Field of Classification Search
None
See application file for complete search history.

(56) References Cited

U.S. PATENT DOCUMENTS

| | | | | |
|---|---|---|---|---|
| 9,285,589 B2* | 3/2016 | Osterhout | ............ | G06F 3/005 |
| 10,514,545 B2* | 12/2019 | De Nardi | ............ | G06F 3/012 |
| 10,572,024 B1* | 2/2020 | Saba | ............ | G02B 27/0149 |
| 10,636,212 B2* | 4/2020 | Tamaoki | ............ | G06T 19/006 |
| 10,642,344 B2* | 5/2020 | Kobayashi | ............ | G06F 3/011 |
| 2017/0307891 A1* | 10/2017 | Bucknor | ............ | G01S 1/70 |
| 2017/0345219 A1* | 11/2017 | Holz | ............ | G06F 3/147 |
| 2017/0357334 A1* | 12/2017 | Balan | ............ | G06F 3/0346 |
| 2018/0188353 A1* | 7/2018 | Chen | ............ | G01S 5/26 |
| 2019/0362557 A1* | 11/2019 | Lacey | ............ | G06T 19/006 |

* cited by examiner

*Primary Examiner* — Duane N Taylor, Jr.
(74) *Attorney, Agent, or Firm* — Greenberg Traurig (57) ABSTRACT

Automatically switching between different modes of using user motions to control applications running in a computing device. For example, the computing device communicates with devices attached to portions of a user (e.g., arm, hand) respectively to receive motion-based measurement data. One of the devices is attached to a portion of the user (e.g., hand) and capable of tracking six independent motions of the portion of the user. The computing device can generate input controls for one or more applications running therein using measurements based on the six independent motions in a first mode, and using measurements based on three of the six independent motions in a second mode. Based on an indication derived from inputs, or the lack of inputs, from some of the devices attached to the portions of the user, the computing device can automatically switch between the first and second modes.

18 Claims, 7 Drawing Sheets

AUTOMATIC SWITCHING BETWEEN DIFFERENT MODES OF TRACKING USER MOTIONS TO CONTROL COMPUTER APPLICATIONS

RELATED APPLICATIONS

The present application relates to U.S. patent application Ser. No. 16/044,984, filed Jul. 25, 2018 and entitled "Calibration of Measurement Units in Alignment with a Skeleton Model to Control a Computer System," U.S. patent application Ser. No. 15/973,137, filed May 7, 2018 and entitled "Tracking User Movements to Control a Skeleton Model in a Computer System," U.S. patent application Ser. No. 15/868,745, filed Jan. 11, 2018 and entitled "Correction of Accumulated Errors in Inertial Measurement Units Attached to a User," U.S. patent application Ser. No. 15/864,860, filed Jan. 8, 2018 and entitled "Tracking Torso Leaning to Generate Inputs for Computer Systems," U.S. patent application Ser. No. 15/847,669, filed Dec. 19, 2017 and entitled "Calibration of Inertial Measurement Units Attached to Arms of a User and to a Head Mounted Device," U.S. patent application Ser. No. 15/817,646, filed Nov. 20, 2017 and entitled "Calibration of Inertial Measurement Units Attached to Arms of a User to Generate Inputs for Computer Systems," U.S. patent application Ser. No. 15/813,813, filed Nov. 15, 2017 and entitled "Tracking Torso Orientation to Generate Inputs for Computer Systems," U.S. patent application Ser. No. 15/792,255, filed Oct. 24, 2017 and entitled "Tracking Finger Movements to Generate Inputs for Computer Systems," U.S. patent application Ser. No. 15/787,555, filed Oct. 18, 2017 and entitled "Tracking Arm Movements to Generate Inputs for Computer Systems," and U.S. patent application Ser. No. 15/492,915, filed Apr. 20, 2017 and entitled "Devices for Controlling Computers based on Motions and Positions of Hands," the entire disclosures of which applications are hereby incorporated herein by reference.

FIELD OF THE TECHNOLOGY

At least a portion of the present disclosure relates to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. App. Pub. No. 2016/0085310 discloses techniques to track hand or body pose from image data in which a best candidate pose from a pool of candidate poses is selected as the current tracked pose.

U.S. Pat. App. Pub. No. 2017/0344829 discloses an action detection scheme using a recurrent neural network (RNN) where joint locations are applied to the recurrent neural network (RNN) to determine an action label representing the action of an entity depicted in a frame of a video.

U.S. Pat. App. Pub. No. 2017/0186226 discloses a calibration engine that uses a machine learning system to extracts a region of interest to compute values of shape parameters of a 3D mesh model.

U.S. Pat. App. Pub. No. 2017/0186226 discloses a system where an observed position is determined from an image and a predicted position is determined using an inertial measurement unit. The predicted position is adjusted by an offset until a difference between the observed position and the predicted position is less than a threshold value.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described to avoid obscuring the description. References to one or an embodiment in the present disclosure are not necessarily references to the same embodiment; and, such references mean at least one.

The present disclosure includes techniques for automatically switching between different modes of using user motions to control applications running in a computing device. For example, the computing device communicates with tracking devices (sensor modules) attached to portions of a user (e.g., arm, hand) respectively to receive motion-based measurement data. One of the devices is attached to a portion of the user (e.g., hand) and capable of tracking six degrees of freedom (DoF) of independent motions of the portion of the user. The computing device can generate input controls for one or more applications running therein based on motion measurements. In a 6-DoF mode, the input controls are generated based on the six independent motions; and in a 3-DoF mode, the input controls are generated based on three of the six independent motions. Based on an indication derived from inputs, or the lack of inputs, from some of the devices attached to the portions of the user, the computing device can automatically switch between the first and second modes. For example, a handheld device can have a user interface element, such as a touch pad, a button, joystick, etc. The system can switch to the second mode when the user interface element has not been used for a predetermined period of time, and switch back to the first mode in response to the user interface element being used. Alternatively, or in combination, images generated from a camera in a head mounted device can be examined to determine whether the hand is captured in the image. The mode switch can be performed based at least in part on whether or not the hand is captured in the images generated by the camera.

For example, some handheld devices can track six degrees of freedom (DoF) of independent motions (e.g., orientations and positions); and other handheld devices can track less, for example, three degrees of freedom (DoF). When a 6-DoF device is used with an application a way that is typically for a 3-DoF device, it can be desirable to switch the system from a 6-DoF mode to a 3-DoF mode, such that the measurements for the motions that are not used in the application are not generated, not transmitted, and/or not used/computed, to reduce power consumption, to reduce usage of communication bandwidth, and/or to reduce computational workload.

In some embodiments, a handheld tracking device can have a user interface element (e.g., a touch pad, a joystick, or a button). If the host computing device does not receive user input made via the user interface element (e.g., a touch pad, a joystick, or one or more buttons) for a time period of a predetermined length, the system can assume that the user is using the tracking device in a 3-DoF mode and thus switch from the 6-DoF mode to the 3-DoF mode.

In some embodiments, when in the 3-DoF mode, the host computing device can ignore the unused motion measurement data transmitted from the tracking device. For example, when the 3-DoF mode generates input control based the orientations, the measurement data based on tracking the position of the tracking device can be ignored. Alternatively, the host computing device can instruct the tracking device to stop generating and/or transmitting the unused motion measurement data in the 3-DoF mode.

In some embodiments, in response to the user using the user interface element (e.g., a touch pad, a joystick, or a button), the host computing device can go back to the 6-DoF mode.

In some other embodiments, when the system is in a 3-DoF mode, the host computing device can further assume that a second tracking/sensor device (e.g., armband module) is not going to be used in the application. Therefore, the host computing device can ignore the motion tracking data from the second sensor device (e.g., armband module) and/or instruct the second tracing/sensor device (e.g., armband module) to enter a sleeping mode.

Optionally and/or in combination, the system can switch between different modes in response to whether the images generated by a head mounted camera shows or does not show the hand having the handheld tracking device.

Optionally, when the system switches between different modes, the system performs operations to calibrate the inertial measurement unit (IMU) measurements of the sensor devices. For example, the calibration can be performed using the techniques disclosed in U.S. Pat. App. Pub. No. 2019/0187784, entitled "Calibration of Inertial Measurement Units Attached to Arms of a User and to a Head Mounted Device", and/or U.S. patent application Ser. No. 16/044,984, filed Jul. 25, 2018, entitled "Calibration of Measurement Units in Alignment with a Skeleton Model to Control a Computer System," the entire disclosures of which patent documents are hereby incorporated herein by reference.

In general, uncalibrated measurements of an inertial measurement unit (IMU) can be considered as orientations of the inertial sensor measured relative to an unknown reference coordinate system. A calibration process identifies the unknown reference coordinate system and its relationship with respect to a known coordinate system. After the calibration the measurements of the IMU are relative to the known coordinate system. For example, the calibrated measurements can be an orientation relative to a predetermined orientation in the space, relative to a particular orientation of the sensor device at a specific time instance, relative to the orientation of the arm or hand of a user at a time instance, or relative to a reference orientation/pose of a skeleton model of the user.

In some embodiments, the determination of calibration parameters of the measurements of the inertial measurement unit such that the calibrated measurements of the inertial measurement unit are relative to a known orientation, such as the orientation of the sensor device in which the inertial measurement unit is installed, the orientation of the arm or hand of a user to which the sensor device is attached, or the orientation of a skeleton model of the user in a reference pose. For example, a stereo camera integrated in a head mount display (HMD) can be used to capture images of sensor modules on the user. In some embodiments, Computer vision techniques and/or artificial neural network techniques can process the captured images identify one or more orientations that can be used to calibrate the measurements of the inertial measurement units in the sensor modules.

In general, the kinematics of a user can be modeled using a skeleton model having a set of rigid parts/portions connected by joints. For example, the head, the torso, the left and right upper arms, the left and right forearms, the palms, phalange bones of fingers, metacarpal bones of thumbs, upper legs, lower legs, and feet can be considered as rigid parts that are connected via various joints, such as the neck, shoulders, elbows, wrist, and finger joints.

The movements of the parts in the skeleton model of a user can be controlled by the movements of the corresponding portions of the user tracked using sensor modules. The sensor modules can determine the orientations of the portions of the user, such as the hands, arms, and head of the user. The measured orientations of the corresponding parts of the user determine the orientations of the parts of the skeleton model, such as hands and arms. The relative positions and/or orientations of the rigid parts collectively represent the pose of the user and/or the skeleton model. The skeleton model of the user can be used to control the presentation of an avatar of the user, to identify the gesture inputs of the user, and/or to make a virtual realty or augmented reality presentation of the user.

Figure 1:
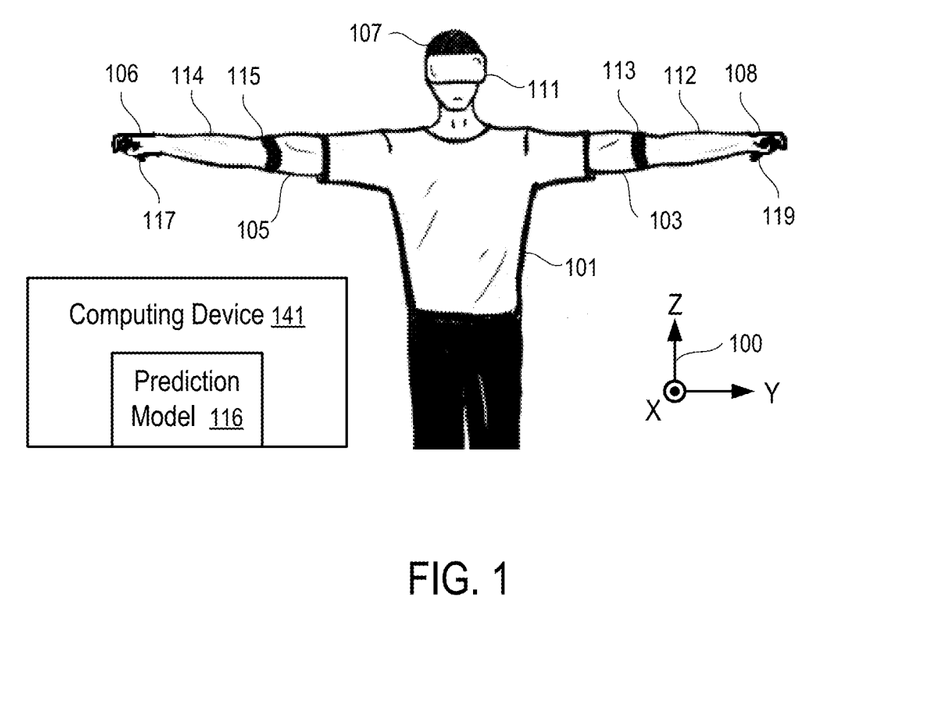
FIG. 1 illustrates a system to track user movements according to one embodiment.

FIG. 1 illustrates a system to track user movements according to one embodiment.

FIG. 1 illustrates various parts of a user, such as the torso (101) of the user, the head (107) of the user, the upper arms (103 and 105) of the user, the forearms (112 and 114) of the user, and the hands (106 and 108) of the user.

In an application illustrated in FIG. 1, the hands (106 and 108) of the user are considered rigid parts movable around the wrists of the user. In other applications, the palms and finger bones of the user can be further tracked for their movements relative to finger joints (e.g., to determine the hand gestures of the user made using relative positions among fingers of a hand and the palm of the hand).

In FIG. 1, the user wears several sensor modules/devices (111, 113, 115, 117 and 119) that track the orientations of parts of the user that are considered, or recognized as, rigid in an application.

In an application illustrated in FIG. 1, rigid parts of the user are movable relative to the torso (101) of the user and relative to each other. Examples of the rigid parts include the head (107), the upper arms (103 and 105), the forearms (112 and 114), and the hands (106 and 108). The joints, such as neck, shoulder, elbow, and/or wrist, connect the rigid parts of the user to form one or more kinematic chains. The kinematic chains can be modeled in a computing device (141) to control the application.

To track the relative positions/orientations of rigid parts in a kinematic chain that connects the rigid parts via one or more joints, a tracking device can be attached to each individual rigid part in the kinematic chain to measure its orientation.

In general, the position and/or orientation of a rigid part in a reference system (100) can be tracked using one of many systems known in the field. Some of the systems may use one or more cameras to take images of a rigid part marked using optical markers and analyze the images to compute the position and/or orientation of the part. Some of the systems may track the rigid part based on signals transmitted from, or received at, a tracking device attached to the rigid part, such as radio frequency signals, infrared signals, ultrasound signals. The signals may correspond to signals received in the tracking device, and/or signals emitted from the tracking device. Some of the systems may use inertial measurement units (IMUs) to track the position and/or orientation of the tracking device.

In FIG. 1, the sensor devices (111, 113, 115, 117 and 119) are used to track some of the rigid parts (e.g., 107, 103, 105, 106, 108) in the one or more kinematic chains, but sensor devices are omitted from other rigid parts (101, 112, 114) in the one or more kinematic chains to reduce the number of sensor devices used and/or to improve user experience for wearing the reduced number of sensor devices.

The computing device (141) can have a prediction model (141) trained to generate predicted measurements of parts (101, 112, 114, 107, 103, 105, 106, and/or 108) of the user based on the measurements of the sensor devices (111, 113, 115, 117 and 119).

For example, the prediction model (141) can be implemented using an artificial neural network (ANN) in the computing device (141) to predict the measurements of the orientations of the rigid parts (101, 112, 114) that have omitted sensor devices, based on the measurements of the orientations rigid parts (107, 103, 105, 106, 108) that have the attached sensor devices (111, 113, 115, 117 and 119). Some details and examples of such techniques can be found in U.S. Pat. No. 10,416,755 issued on Sep. 17, 2019 and entitled "Motion Predictions of Overlapping Kinematic Chains of a Skeleton Model used to Control a Computer System," the entire disclosure of which is hereby incorporated herein by reference.

Further, the artificial neural network can be trained to predict the measurements of the orientations of the rigid parts (107, 103, 105, 106, 108) that would be measured by another system (e.g., an optical tracking system), based on the measurement of the attached sensor devices (111, 113, 115, 117 and 119) that measure orientations using a different technique (e.g., IMUs).

The sensor devices (111, 113, 115, 117, 119) communicate their movement measurements to the computing device (141), which computes or predicts the orientation of the rigid parts (107, 103, 105, 106, 108, 101, 112, 114) by applying the measurements obtained from the attached sensor devices (111, 113, 115, 117 and 119) as inputs to an artificial neural network trained in a way as further discussed below.

In some implementations, each of the sensor devices (111, 113, 115, 117 and 119) communicates its measurements directly to the computing device (141) in a way independent from the operations of other sensor devices.

Alternative, one of the sensor devices (111, 113, 115, 117 and 119) may function as a base unit that receives measurements from one or more other sensor devices and transmit the bundled and/or combined measurements to the computing device (141). In some instances, the artificial neural network is implemented in the base unit and used to generate the predicted measurements that are communicated to the computing device (141).

Preferably, wireless connections made via a personal area wireless network (e.g., Bluetooth connections), or a local area wireless network (e.g., Wi-Fi connections) are used to facilitate the communication from the sensor devices (111, 113, 115, 117 and 119) to the computing device (141).

Alternatively, wired connections can be used to facilitate the communication among some of the sensor devices (111, 113, 115, 117 and 119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141).

The hand (106), the forearm (114), and the upper arm (105) can be considered a kinematic chain, for which an artificial neural network can be trained to predict the orientation measurements generated by an optical track system, based on the sensor inputs from the sensor devices (117 and 115) that are attached to the hand (106) and the upper arm (105), without a corresponding device on the forearm (114).

Optionally or in combination, the hand module (e.g., 117) may combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111). The head module (111) may further determine the orientation of the torso (101) from the orientation of the arm modules (115 and 113) and/or the orientation of the head module (111), using an artificial neural network trained for a corresponding kinematic chain, which includes the upper arms (103 and 105), the torso (101), and/or the head (107).

For the determination of the orientation of the torso (101), the hand modules (117 and 119) are optional in the system illustrated in FIG. 1.

Further, in some instances the head module (111) is not used in the tracking of the orientation of the torso (101) of the user.

Typically, the measurements of the sensor devices (111, 113, 115, 117 and 119) are calibrated for alignment with a common reference system, such as the coordinate system (100).

For example, the coordinate system (100) can correspond to the orientation of the arms and body of the user in a standardized pose illustrated in FIG. 1. When in the pose of FIG. 1, the arms of the user point in the directions that are parallel to the Y axis; the front facing direction of the user is parallel to the X axis; and the legs, the torso (101) to the head (107) are in the direction that is parallel to the Z axis.

After the calibration, the hands, arms (105, 103), the head (107) and the torso (101) of the user may move relative to each other and relative to the coordinate system (100). The measurements of the sensor devices (111, 113, 115, 117 and 119) provide orientations of the hands (106 and 108), the upper arms (105, 103), and the head (107) of the user relative to the coordinate system (100). The computing device (141) computes, estimates, or predicts the current orientation of the torso (101) and/or the forearms (112 and 114) from the current orientations of the upper arms (105, 103), the current orientation the head (107) of the user, and/or the current orientation of the hands (106 and 108) of the user and their orientation history using the prediction model (116).

Some techniques of using an artificial neural network to predict the movements of certain parts in a skeleton model that are not separately tracked using dedicated sensor devices can be found in U.S. patent application Ser. No. 15/996,389, filed Jun. 1, 2018 and entitled "Motion Predictions of Overlapping Kinematic Chains of a Skeleton Model used to Control a Computer System," and U.S. patent application Ser. No. 15/973,137, filed May 7, 2018 and entitled "tracking User Movements to Control a Skeleton Model in a Computer System," the entire disclosures of which applications are hereby incorporated herein by reference.

Optionally or in combination, the computing device (141) may further compute the orientations of the forearms from the orientations of the hands (106 and 108) and upper arms (105 and 103), e.g., using a technique disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

Figure 2:
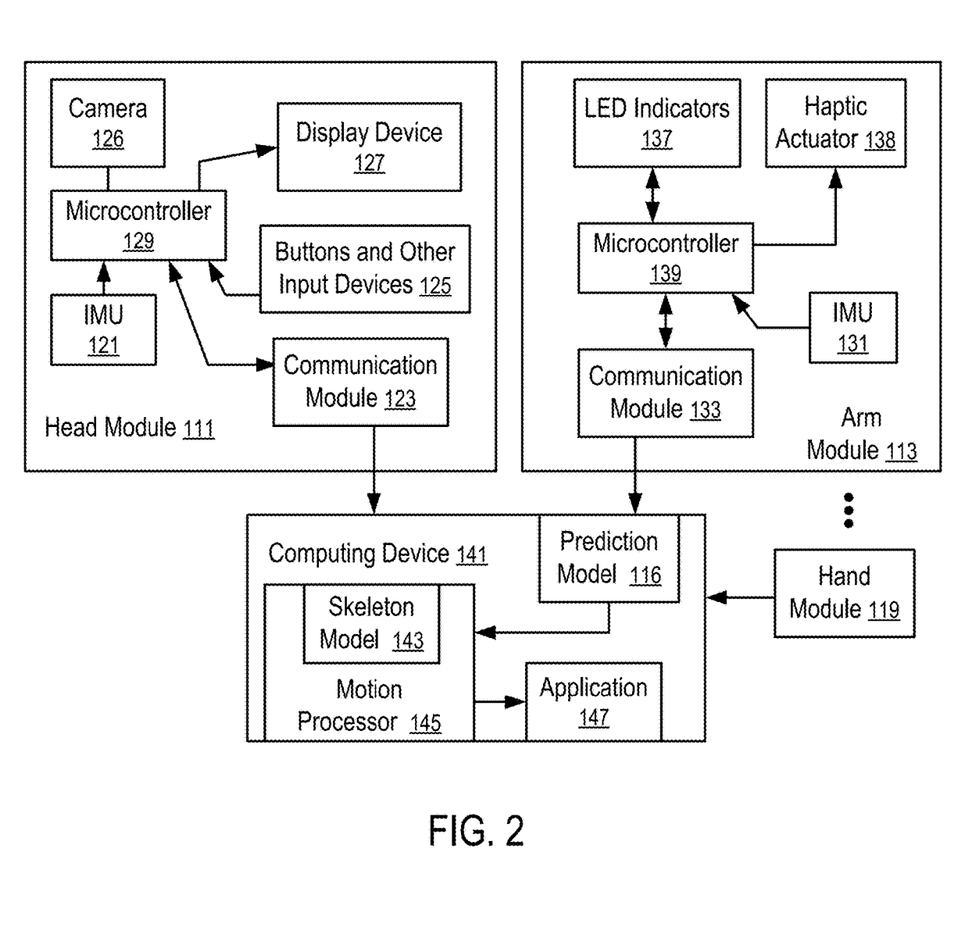
FIG. 2 illustrates a system to control computer operations according to one embodiment.

FIG. 2 illustrates a system to control computer operations according to one embodiment. For example, the system of FIG. 2 can be implemented via attaching the arm modules (115 and 113) to the upper arms (105 and 103) respectively, the head module (111) to the head (107) and/or hand modules (117 and 119), in a way illustrated in FIG. 1.

In FIG. 2, the head module (111) and the arm module (113) have micro-electromechanical system (MEMS) inertial measurement units (IMUs) (121 and 131) that measure motion parameters and determine orientations of the head (107) and the upper arm (103).

Similarly, the hand modules (117 and 119) can also have IMUs. In some applications, the hand modules (117 and 119) measure the orientation of the hands (106 and 108) and the movements of fingers are not separately tracked. In other applications, the hand modules (117 and 119) have separate IMUs for the measurement of the orientations of the palms of the hands (106 and 108), as well as the orientations of at least some phalange bones of at least some fingers on the hands (106 and 108). Examples of hand modules can be found in U.S. patent application Ser. No. 15/792,255, filed Oct. 24, 2017 and entitled "Tracking Finger Movements to Generate Inputs for Computer Systems," the entire disclosure of which is hereby incorporated herein by reference.

Each of the IMUs (131 and 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) can have a prediction model (116) and a motion processor (145). The measurements of the IMUs (e.g., 131, 121) from the head module (111), arm modules (e.g., 113 and 115), and/or hand modules (e.g., 117 and 119) are used in the prediction module (116) to generate predicted measurements of at least some of the parts that do not have attached sensor modules, such as the torso (101), and forearms (112 and 114). The predicted measurements and/or the measurements of the IMUs (e.g., 131, 121) are used in the motion processor (145).

Figure 3:
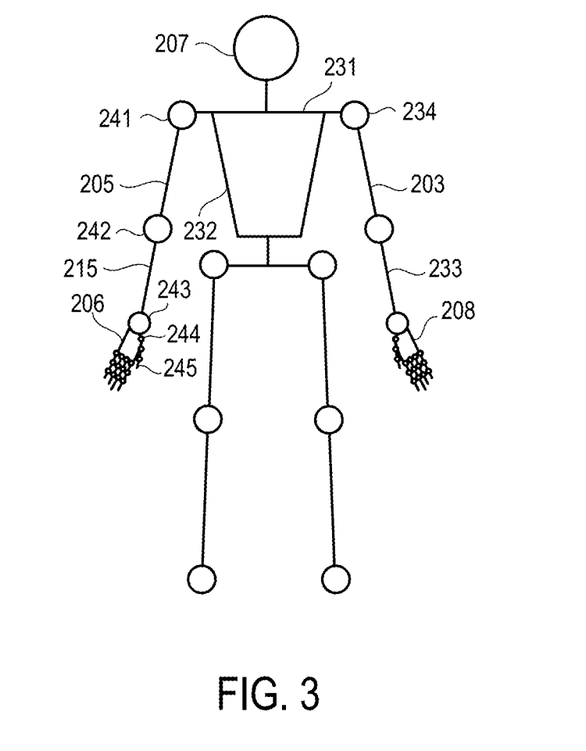
FIG. 3 illustrates a skeleton model that can be controlled by tracking user movements according to one embodiment.

The motion processor (145) has a skeleton model (143) of the user (e.g., illustrated FIG. 3). The motion processor (145) controls the movements of the parts of the skeleton model (143) according to the movements/orientations of the corresponding parts of the user. For example, the orientations of the hands (106 and 108), the forearms (112 and 114), the upper arms (103 and 105), the torso (101), the head (107), as measured by the IMUs of the hand modules (117 and 119), the arm modules (113 and 115), the head module (111) sensor modules and/or predicted by the prediction model (116) based on the IMU measurements are used to set the orientations of the corresponding parts of the skeleton model (143).

Since the torso (101) does not have a separately attached sensor module, the movements/orientation of the torso (101) can be predicted using the prediction model (116) using the sensor measurements from sensor modules on a kinematic chain that includes the torso (101). For example, the prediction model (116) can be trained with the motion pattern of a kinematic chain that includes the head (107), the torso (101), and the upper arms (103 and 105) and can be used to predict the orientation of the torso (101) based on the motion history of the head (107), the torso (101), and the upper arms (103 and 105) and the current orientations of the head (107), and the upper arms (103 and 105).

Similarly, since a forearm (112 or 114) does not have a separately attached sensor module, the movements/orientation of the forearm (112 or 114) can be predicted using the prediction model (116) using the sensor measurements from sensor modules on a kinematic chain that includes the forearm (112 or 114). For example, the prediction model (116) can be trained with the motion pattern of a kinematic chain that includes the hand (106), the forearm (114), and the upper arm (105) and can be used to predict the orientation of the forearm (114) based on the motion history of the hand (106), the forearm (114), the upper arm (105) and the current orientations of the hand (106), and the upper arm (105).

The skeleton model (143) is controlled by the motion processor (145) to generate inputs for an application (147) running in the computing device (141). For example, the skeleton model (143) can be used to control the movement of an avatar/model of the arms (112, 114, 105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera (126), etc.

In some instances, a stereo camera (126) is used to capture stereo images of the sensor devices (113, 115, 117, 119) to calibrate their measurements relative to a common coordinate system, such as the coordinate system (100) defined in connection with a reference pose illustrated in FIG. 1. Further, the LED indicators (e.g., 137) of a sensor module (e.g., 113) can be turned on during the time of capturing the stereo images such that the orientation and/or identity of the sensor module (e.g., 113) can be determined from the locations and/or patterns of the LED indicators.

When the LED lights are not captured in the images, or when the sensor device do not have LED lights, the orientation of the sensor module can be predicted based on an image of a portion of the user wearing the sensor device in a predefined manner. For example, an ANN can be used to determine the orientations of the wrist, palm, distal, middle and proximal phalanges of thumb and index finger from the image of the hand and forearm of the user; and the orientations can be further used in another ANN to determine the orientation of the sensor device.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

When a hand module (e.g., 117 or 119) tracks the orientations of the palm and a selected set of phalange bones, the motion pattern of a kinematic chain of the hand captured in the predictive mode (116) can be used in the prediction model (116) to predict the orientations of other phalange bones that do not wear sensor devices.

FIG. 2 shows a hand module (119) and an arm module (113) as examples. In general, an application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms (112 and 114) of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicators (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model that can be controlled by tracking user movements according to one embodiment. For example, the skeleton model of FIG. 3 can be used in the motion processor (145) of FIG. 2.

The skeleton model illustrated in FIG. 3 includes a torso (232) and left and right upper arms (203 and 205) that can move relative to the torso (232) via the shoulder joints (234 and 241). The skeleton model may further include the forearms (215 and 233), hands (206 and 208), neck, head (207), legs and feet. In some instances, a hand (206) includes a palm connected to phalange bones (e.g., 245) of fingers, and metacarpal bones of thumbs via joints (e.g., 244).

The positions/orientations of the rigid parts of the skeleton model illustrated in FIG. 3 are controlled by the measured orientations of the corresponding parts of the user illustrated in FIG. 1. For example, the orientation of the head (207) of the skeleton model is configured according to the orientation of the head (107) of the user as measured using the head module (111); the orientation of the upper arm (205) of the skeleton model is configured according to the orientation of the upper arm (105) of the user as measured using the arm module (115); and the orientation of the hand (206) of the skeleton model is configured according to the orientation of the hand (106) of the user as measured using the hand module (117); etc.

For example, the tracking system as illustrated in FIG. 2 measures the orientations of the modules (111, 113, . . . , 119) using IMUs (e.g., 111, 113, . . . ). The inertial-based sensors offer good user experiences, have less restrictions on the use of the sensors, and can be implemented in a computational efficient way. However, the inertial-based sensors may be less accurate than certain tracking methods in some situations, and can have drift errors and/or accumulated errors through time integration. Drift errors and/or accumulated errors can be considered as the change of the reference orientation used for the measurement from a known reference orientation to an unknown reference orientation. An update calibration can remove the drift errors and/or accumulated errors.

An optical tracking system can use one or more cameras (e.g., 126) to track the positions and/or orientations of optical markers (e.g., LED indicators (137)) that are in the fields of view of the cameras. When the optical markers are within the fields of view of the cameras, the images captured by the cameras can be used to compute the positions and/or orientations of optical markers and thus the orientations of parts that are marked using the optical markers. However, the optical tracking system may not be as user friendly as the inertial-based tracking system and can be more expensive to deploy. Further, when an optical marker is out of the fields of view of cameras, the positions and/or orientations of optical marker cannot be determined by the optical tracking system.

An artificial neural network of the prediction model (116) can be trained to predict the measurements produced by the optical tracking system based on the measurements produced by the inertial-based tracking system. Thus, the drift errors and/or accumulated errors in inertial-based measurements can be reduced and/or suppressed, which reduces the need for re-calibration of the inertial-based tracking system. Further details on the use of the prediction model (116) can be found in U.S. patent application Ser. No. 15/973,137, filed May 7, 2018 and entitled "tracking User Movements to Control a Skeleton Model in a Computer System," the entire disclosure of which application is hereby incorporated herein by reference.

Further, the orientations determined using images captured by the camera (126) can be used to calibrate the measurements of the sensor devices (111, 113, 115, 117, 119) relative to a common coordinate system, such as the coordinate system (100) defined using a standardized reference pose illustrated in FIG. 1.

Figure 4:
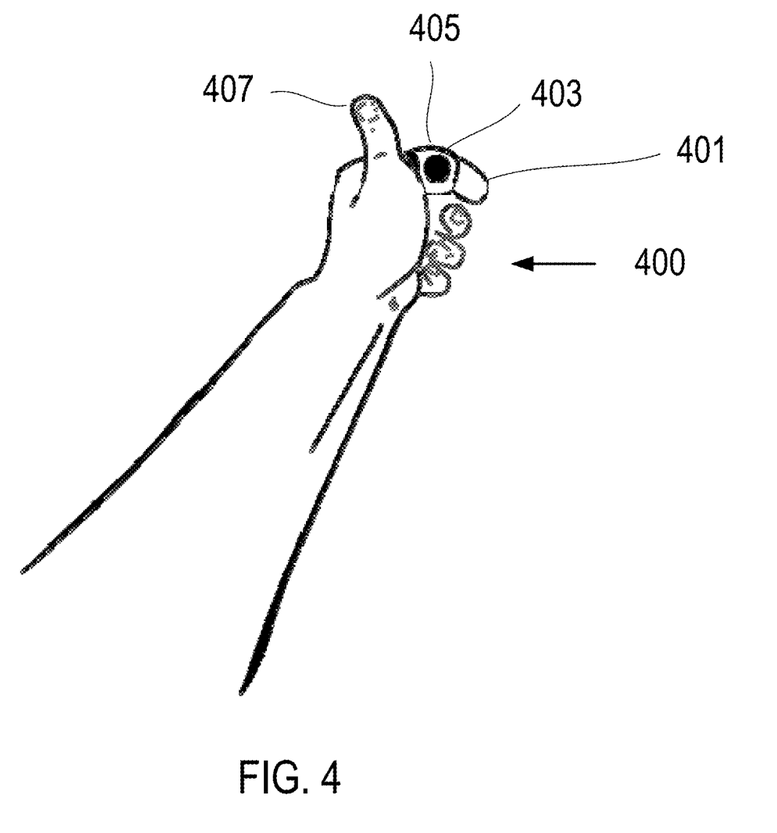
FIGS. 4-5 illustrate an example of tracking mode switching using input data received from an inertial measurement unit (IMU) tracking device with a touchpad panel.
Figure 5:
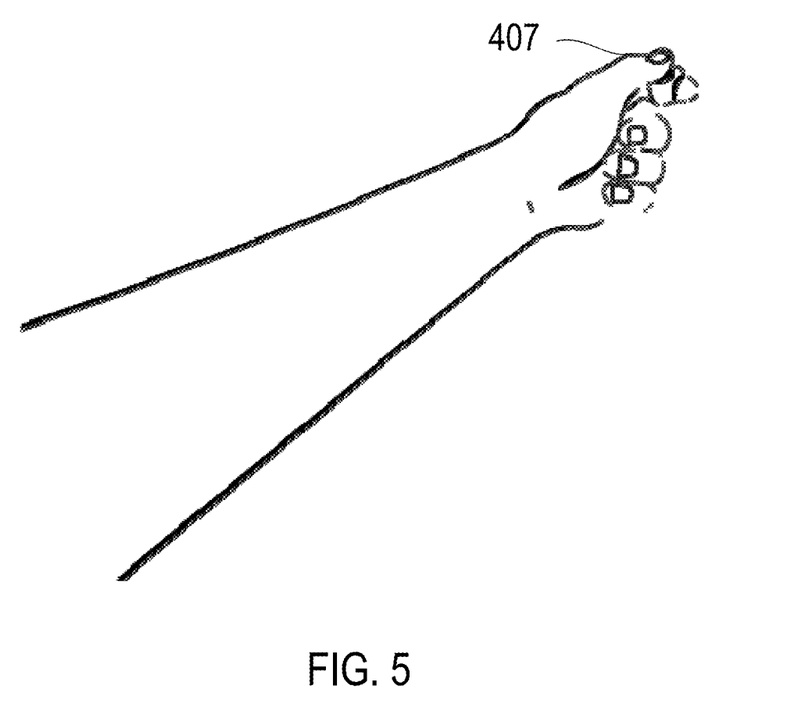

FIGS. 4-5 illustrate an example of tracking mode switching using input data received from an inertial measurement unit (IMU) tracking device (e.g., 405) with a touchpad panel (e.g., 403). Alternatively, or in combination, the tracking device (e.g., 405) can have a joystick, and/or one or more buttons as user interface elements.

As illustrated in FIG. 4, a sensor device (405) having an inertial measurement unit, similar to IMU (131) in an arm module (113) can be configured to have a form factor of a ring adapted to be worn on the middle phalange of the index finger (401) of the hand (400). The sensor device (405) is configured with a touch pad (403) that can be ready touched by the thumb (407) to generate a touch input. For example, in FIG. 5, the tracking system can activate the 6-DoF mode once a touch input made using the thumb (407) touching the touchpad (403) was determined. In some embodiment, in response to receiving a touch input from the touch pad (403), the host computing system can switch from the 3-DoF to the 6-DoF as illustrated in FIG. 5.

For example, the tracking system can activate 3-DoF mode, if the system does not receive any touch input generated by the touch pad (403) from the handheld sensor device (e.g., 405) for a predetermined length of time (e.g., 15 seconds, a minute, three minutes), as illustrated in FIG. 4. For example, if user doesn't use the touchpad panel (403) for any interaction with virtual/augmented environment for the predetermined length of time, the system can automatically activate the 3-DoF mode as illustrated in FIG. 4. In other words, in response to a determination that no touch input from the touch pad (403) is received in the host computing system in a period of time of a predetermined length, the host computing system can switch from a higher tracking mode (e.g., 6-DoF mode) to a lower tracking mode (e.g., 3-DoF mode).

In general, the automated switching between the 3-DoF mode and the 6-DoF mode can be based on the inputs or the lack of inputs from one or more user interface elements (e.g., a touch pad, a joystick, one or more buttons), and/or based on whether the user hand holding the tracking device (e.g., 405, 117, or 119) is detectable in the image captured in a head mounted camera (e.g., 126). For example, after a period of time of a predetermined length during which no user input has been received from the touch pad, the joystick, and/or one or more buttons configured on the tracking device (e.g., 405, 117, or 119) and/or the head mounted camera (e.g., 126) failing to capture the image of the hand holding the tracking device (e.g., 405, 117, or 119), the system switches from the 6-DoF mode to the 3-DoF mode; and in response to one or more user inputs are received from the touch pad, the joystick, and/or one or more buttons configured on the tracking device (e.g., 405, 117, or 119) and/or the head mounted camera (e.g., 126) capturing the image of the hand holding the tracking device (e.g., 405, 117, or 119), the system switches from the 3-DoF mode to the 6-DoF mode.

In some embodiments, when the tracking system activates or switches to the 3-DoF mode, the computing device (141) starts to ignore a part of the motion data received from the senor device (405) and/or the motion data received from another sensor device (e.g., armband module). For example, when the tracking system is operating in the 3-DoF mode, the host computing device can discard measurements of a portion of 6-DoF that are not used in the 3-DoF mode, such as ignoring the measurements of the position data but not the orientation data of the handheld sensor device (405). Alternatively, the computing device (141) can instruct the handheld sensor device (405) to stop/suppress generating and/or transmitting the measurements that would be discarded in the 3-DoF mode.

Optionally, when the tracking system activates or switches to the 3-DoF mode, the tracking system can instruct another sensor device (e.g., armband module) to enter a sleeping mode.

Figure 6:
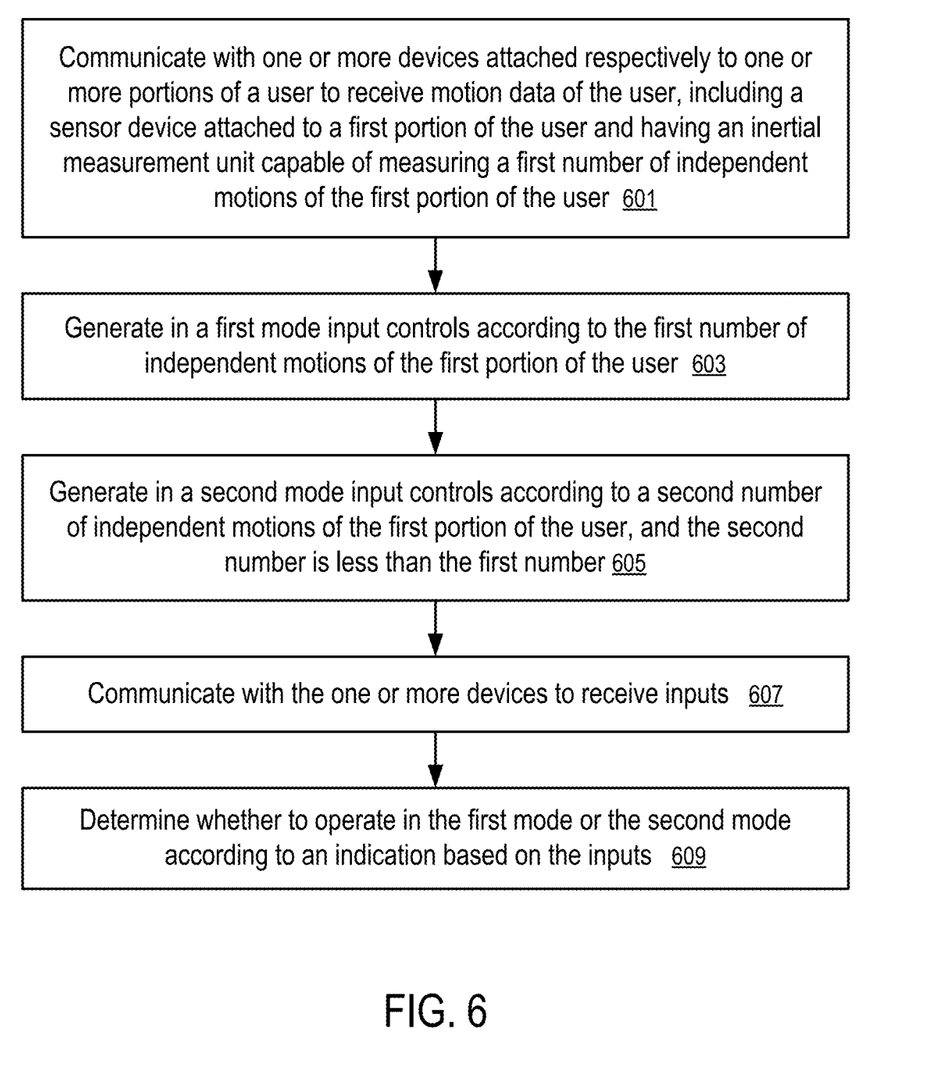
FIG. 6 shows a method for automatic switching between two modes for tracking/sensor devices.
Figure 7:
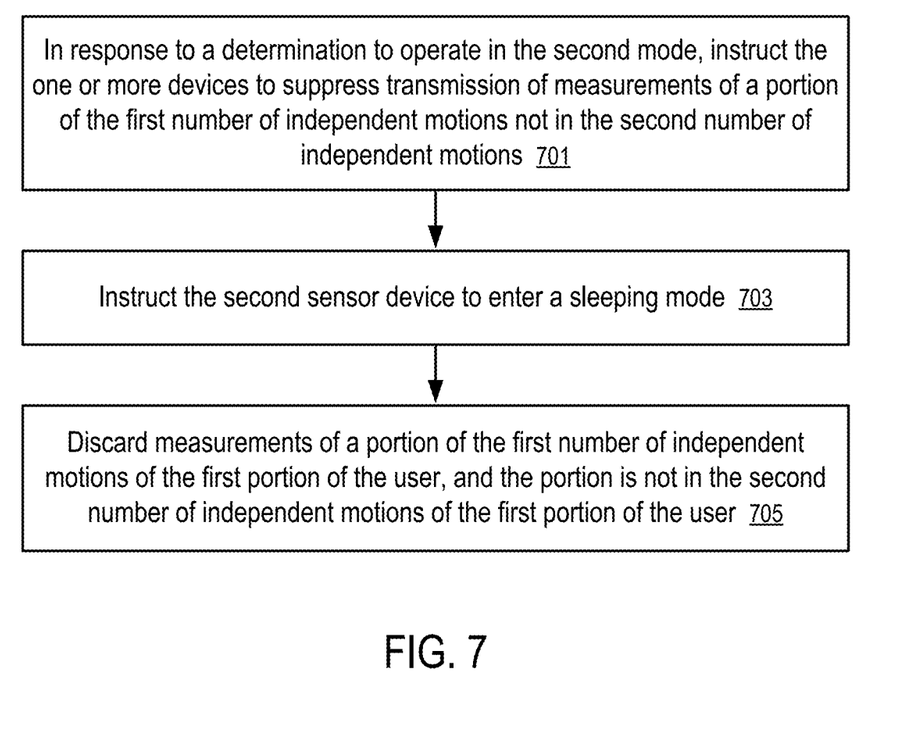
FIG. 7 shows another method for automatic switching between two modes for tracking/sensor devices.

FIGS. 6-7 show methods for automatic switching between higher tracking mode (e.g., 6-DoF) and lower tracking mode (e.g., 3-DoF). For example, the methods of FIGS. 6-7 can be used in a system of FIG. 2 and/or FIG. 1 to control a skeleton model of FIG. 3.

In FIG. 6, the method includes: communicating (601) with one or more devices (e.g., handheld module 405, armband module 113 etc.) attached respectively to one or more portions of a user (e.g., arm, hand) to receive motion data of the user, including a sensor device (e.g., 405) attached to a first portion (e.g., hand) of the user and having an inertial measurement unit capable of measuring a first number of independent motions (e.g., 6-DoF) of the first portion of the user; generating (603) in a first mode (e.g., 6-DoF mode) input controls according to the first number of independent motions of the first portion of the user; generating (605) in a second mode (e.g., 3-DoF mode) input controls according to a second number of independent motions (e.g., 3-DoF) of the first portion of the user, where the second number is less than the first number; communicating (607) with the one or more devices to receive inputs; and determining (609) whether to operate in the first mode or the second mode according to an indication based on the inputs.

In FIG. 7, the method includes: in response to a determination to operate in the second mode, instructing (701) the one or more devices to suppress transmission of measurements of a portion of the first number of independent motions not in the second number of independent motions; instructing (703) the second sensor device to enter a sleeping mode; discarding (705) measurements of a portion of the first number of independent motions of the first portion of the user, and the portion is not in the second number of independent motions of the first portion of the user.

For example, the host computing device can communicate with one or more devices (e.g., handheld module 405, armband module etc.) attached respectively to one or more portions of a user (e.g., arm, hand) to receive motion data of the user. In some embodiments, the one or more devices can include a sensor device (405) attached to a first portion of the user (400). In some other embodiments, the sensor device (405) having an inertial measurement unit capable of measuring a first number of independent motions (e.g., 6-DoF) of the first portion of the user.

For example, the host computing device in a first/higher mode (e.g., 6-DoF) for an application running in the host computing device can generate input controls according to the first number of independent motions (e.g., 6-DoF) of the first portion of the user. In some embodiments, the host computing device in a second/lower mode (e.g., 3-DoF) for the application running in the host computing device can generate input controls according to a second number of independent motions (e.g., 3-DoF) of the first portion of the user, and the second/lower number ((e.g., 3-DoF) is less than the first/higher number (e.g., 6-DoF). In some embodiments, then the host computing device can communicate with the one or more devices to receive inputs. Thus, in some other embodiments, the host computing device can then determine whether to operate in the first/higher tracking mode (e.g., 6-DoF) or the second/lower tracking mode (e.g., 3-DoF) based on those inputs. In some embodiments, those inputs are independent of measurements of motions of the user. In some other embodiments, the host computing device can use the measurements of the portion to determine positions of the first portion of the user.

For example, the first/higher number of independent motions of the first portion of the user is six degrees of freedom of motion of the first portion of the user. For another example, the second/lower number of independent motions of the first portion of the user is three degrees of freedom of motion of the first portion of the user. In some embodiments, the host computing device can use the three degrees of freedom of motion of the first portion of the user to determine orientations of the first portion of the user.

In some embodiments, the sensor device (405) includes a touch pad (403) (and/or other user interface elements, such as a joystick, one or more buttons) and the inputs can be generated by the touch pad (403) (and/or other user interface elements). For example, in response to a determination that no touch input from the touch pad (403) (and/or no user input from a joystick and/or one or more buttons) is received in the host computing system in a period of time of a predetermined length, the host computing system can switch from the first/higher tracking mode (e.g., 6-DoF) to the second/lower tracking mode (e.g., 3-DoF).

In some other embodiments, the one or more devices include a head mounted camera and the inputs can include images from the head mounted camera. For example, the host computing system can automatically switch from the first/higher tracking mode (e.g., 6-DoF) to the second/lower tracking mode (e.g., 3-DoF) based at least in part on a determination that the first portion of the user (e.g., hand) is not captured in an image from the head mounted camera.

For another example, when the tracking system activates or switch to lower tracking mode (e.g., 3-DoF), the tracking system can instruct the one or more devices (e.g., armband module) to suppress transmission of measurements of a portion of the higher number of independent motions (e.g., 6-DoF) not in the lower number of independent motions (e.g., 3-DoF).

In some embodiments, when the tracking system activates or switch to lower tracking mode (e.g., 3-DoF), the tracking system can instruct other sensor device (e.g., armband module) to enter a sleeping mode.

For example, when the tracking system operating in the lower tracking mode (3-DoF), the host computing device can discard measurements of a portion of the first number of independent motions (e.g., 6-DoF) of the portion of the user, and the portion is not in the second number of independent motions (e.g., 3-DoF) of the portion of the user.

The present disclosure includes methods and apparatuses which perform these methods, including data processing systems which perform these methods, and computer readable media containing instructions which when executed on data processing systems cause the systems to perform these methods.

For example, the computing device (141), the arm modules (113, 115) and/or the head module (111) can be implemented using one or more data processing systems.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
communicating, by a host computing device, with one or more devices attached respectively to one or more portions of a user to receive motion data of the user, the one or more devices including a sensor device attached to a first portion of the user, the sensor device having an inertial measurement unit capable of measuring a first number of independent motions of the first portion of the user;
generating, by the host computing device in a first mode for an application running in the host computing device, input controls according to the first number of independent motions of the first portion of the user;
generating, by the host computing device in a second mode for the application running in the host computing device, input controls according to a second number of independent motions of the first portion of the user, wherein the second number is less than the first number;
communicating, by the host computing device, with the one or more devices to receive inputs; and
determining, by the host computing system, whether to operate in the first mode or the second mode according to an indication based on the inputs;
wherein the first number of independent motions of the first portion of the user is six degrees of freedom of motion of the first portion of the user; and the second number of independent motions of the first portion of the user is three degrees of freedom of motion of the first portion of the user.

2. The method of claim 1, wherein the three degrees of freedom of motion of the first portion of the user determine orientations of the first portion of the user.

3. The method of claim 2, wherein the inputs are independent of measurements of motions of the user.

4. The method of claim 3, wherein the sensor device includes at least one user interface element; the inputs are generated by the at least one user interface element; and in response to a determination that no input from the at least one user interface element is received in the host computing system in a period of time of a predetermined length, the host computing system switches from the first mode to the second mode.

5. The method of claim 4, wherein in response to receiving an input from the at least one user interface element, the host computing system switches from the second mode to the first mode; wherein the at least one user interface element includes a touch pad, a joystick, or one or more buttons, or any combination therein.

6. The method of claim 3, wherein the one or more devices include a head mounted camera; the inputs include images from the head mounted camera; and the host computing system switches from the first mode to the second mode based at least in part on a determination that the first portion of the user is not captured in an image from the head mounted camera.

7. The method of claim 3, further comprising:
in response to a determination to operate in the second mode, instructing, by the host computing device, the one or more devices to suppress transmission of measurements of a portion of the first number of independent motions not in the second number of independent motions.

8. The method of claim 7, wherein the sensor device is a first sensor device; the one or more devices include a second sensor device having an inertial measurement unit, the method further comprising:
instructing, by the host computing device operating in the second mode, the second sensor device to enter a sleeping mode.

9. The method of claim 3, further comprising:
when operating in the second mode, discarding, by the host computing device, measurements of a portion of the first number of independent motions of the first portion of the user, wherein the portion is not in the second number of independent motions of the first portion of the user.

10. The method of claim 9, wherein the measurements of the portion determine positions of the first portion of the user.

11. A non-transitory computer storage medium storing instructions which, when executed by a computing device, cause the computing device to perform a method, the method comprising:
communicating, by a host computing device, with one or more devices attached respectively to one or more portions of a user to receive motion data of the user, the one or more devices including a sensor device attached to a first portion of the user, the sensor device having an inertial measurement unit capable of measuring a first number of independent motions of the first portion of the user;
generating, by the host computing device in a first mode for an application running in the host computing device, input controls according to the first number of independent motions of the first portion of the user;
generating, by the host computing device in a second mode for the application running in the host computing device, input controls according to a second number of independent motions of the first portion of the user, wherein the second number is less than the first number;
communicating, by the host computing device, with the one or more devices to receive inputs; and
determining, by the host computing system, whether to operate in the first mode or the second mode according to an indication based on the inputs
wherein the first number of independent motions of the first portion of the user is six degrees of freedom of motion of the first portion of the user; and the second number of independent motions of the first portion of the user is three degrees of freedom of motion of the first portion of the user.

12. The non-transitory computer storage medium of claim 11, wherein the three degrees of freedom of motion of the first portion of the user determine orientations of the first portion of the user.

13. The non-transitory computer storage medium of claim 12, wherein the inputs are independent of measurements of motions of the user.

14. The non-transitory computer storage medium of claim 13, wherein the sensor device includes at least one user interface element; the inputs are generated by the at least one user interface element; in response to a determination that no input from the at least one user interface element is received in the host computing system in a period of time of a predetermined length, the host computing system switches from the first mode to the second mode; and in response to receiving an input from the at least one user interface element, the host computing system switches from the second mode to the first mode.

15. The non-transitory computer storage medium of claim 14, wherein the at least one user interface element includes a touch pad, a joystick, or one or more buttons, or any combination therein.

16. The non-transitory computer storage medium of claim 13, wherein the one or more devices include a head mounted camera; the inputs include images from the head mounted camera; and the host computing system switches from the first mode to the second mode based at least in part on a determination that the first portion of the user is not captured in an image from the head mounted camera.

17. The non-transitory computer storage medium of claim 13, further comprising:
in response to a determination to operate in the second mode, instructing, by the host computing device, the one or more devices to suppress transmission of measurements of a portion of the first number of independent motions not in the second number of independent motions.

18. A system, comprising;
a host computing device having one or more processors; and
a plurality of devices configured to be attached to a plurality of portions of a user respectively, each of the plurality of devices having an inertial measurement unit;
wherein a first device in the plurality of devices is configured to be held in a hand of a user, the first device having:
an inertial measurement unit capable of measuring six independent motions of the hand of the user; and
at least one user interface element configured to receive inputs generated by a finger of the hand interacting with the at least one user interface element;
wherein a second device in the plurality of devices is configured to be mounted on a head of the user, the second device having a camera;
wherein the host computing device is configured to generate input controls provided to one or more applications running in the host computing device based at least in part on motion measurements generated by inertial measurement units in the plurality of devices;
wherein when in a first mode, the host computing device is configured to generate input controls according to the six independent motions of the hand of the user;
wherein when in a second mode, the host computing device is configured to generate input controls according to three of the six independent motions of the hand of the user;
wherein the host computing device is configured to switch between the first mode and the second mode based on whether the at least one user interface element has generated an input, whether the at least one user interface element has generated no input in a predetermined period of time, or whether an image from the camera captures the hand of the user, or any combination thereof; and
wherein the at least one user interface element includes a touch pad, a joystick, or one or more buttons, or any combination therein.

* * * * *